Figure 1:
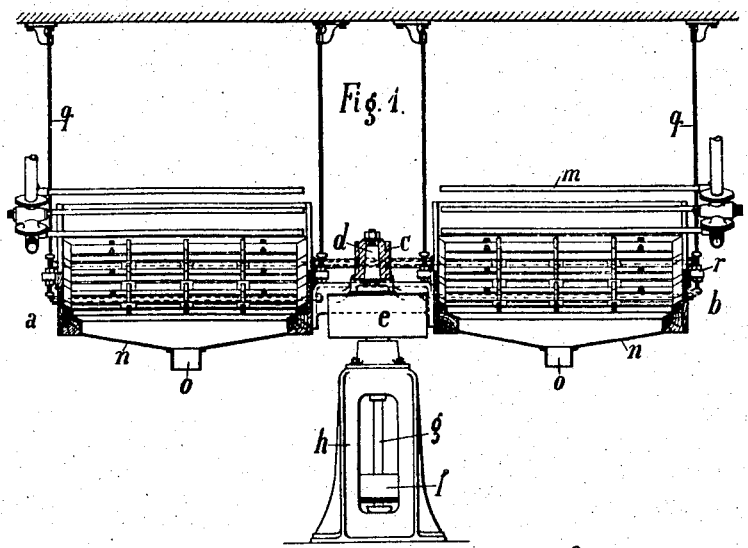

No. 860,068. PATENTED JULY 16, 1907.
W. H. UHLAND.
APPARATUS FOR WASHING STARCH.
APPLICATION FILED FEB. 28, 1905.

2 SHEETS—SHEET 1.

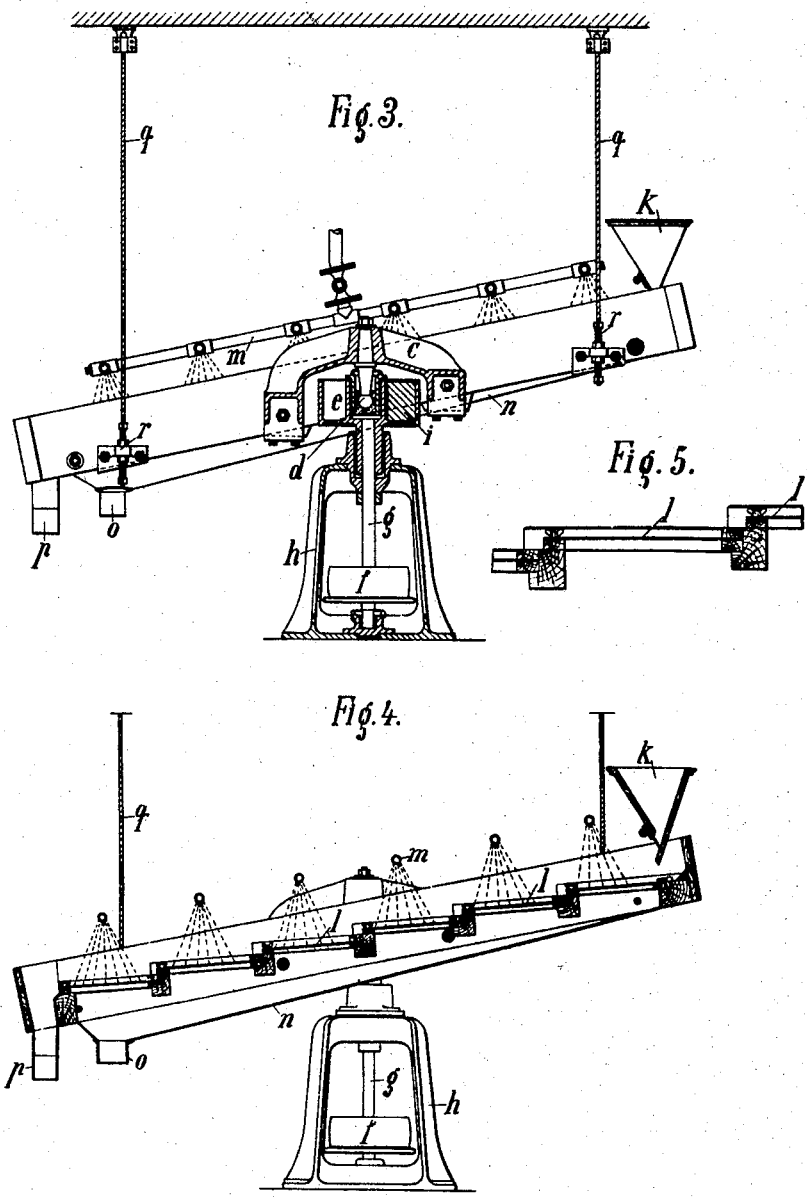

UNITED STATES PATENT OFFICE.

WILHELM HEINRICH UHLAND, OF LEIPZIG-GOHLIS, GERMANY.

APPARATUS FOR WASHING STARCH.

No. 860,068.          Specification of Letters Patent.          Patented July 16, 1907.

Application filed February 28, 1905. Serial No. 247,815.

*To all whom it may concern:*

Be it known that I, WILHELM HEINRICH UHLAND, a subject of the King of Saxony, residing at No. 11 Schillerweg, Leipzig-Gohlis, in the Kingdom of Saxony, German Empire, have invented an Apparatus for Washing Starch, of which the following is a specification.

The sieves used in the manufacture of starch for washing out the starch from the grindings and consisting generally of cylindrical or flat, that is to say, disklike brushes are all possessed by the common drawback that the working surface of the sieves is exhausted only with respect to a comparatively small part; in consequence thereof the effect of the sieves in question is but small; moreover, repairs are generally pretty much difficult. Furthermore, the apparatus in question require a comparatively large space so that the employment of these apparatus in places where space is limited is pretty often nearly impossible. There exist also the reciprocating sieves which are moved to and fro in their longitudinal direction. These sieves require much power and they cause also heavy vibrations of the building, wherein they are installed, and, finally, their efficiency is also but low.

The improved construction forming the subject matter of this invention consists in a sieve-apparatus having a step- or stair-like arrangement of the sieves and the arrangement being with respect to the suspension of the apparatus such that every point of the apparatus moves theoretically in a circle. Practically, however, it may be said, that any point, except that at the pivot $d$, may have an elliptic motion of any eccentricity, because the apparatus is suspended, generally and preferably, by means of ropes and these are elastic. But where rigid rods or bars are used, every point moves actually in a circle.

This apparatus may be employed for all sorts of materials containing starch or the like but it is completely free from the drawbacks before spoken of with respect to the known constructions.

My improved apparatus allows of a complete exhaustion of the whole sieve-surface, necessitates only a small expenditure of power and is not connected with the vibrations experienced with the older constructions. The effect of the apparatus is the more perfect as, owing to the circular motion of every point, also the material to be treated, *i. e.* every particle of the material is caused to move in a circular way, so that a so-to-say rolling or jumping movement results.

Another advantage of my improved arrangement resides in the fact that owing to the sieves being arranged in a step-like manner the material, when descending from one portion of the sieve to the next one, is turned upside down so that always new portions of the material are exposed to the action of the jets of water, conducted down upon the material, in consequence whereof the washing out of the starch is effected quickly as well as perfectly.

Figure 2:
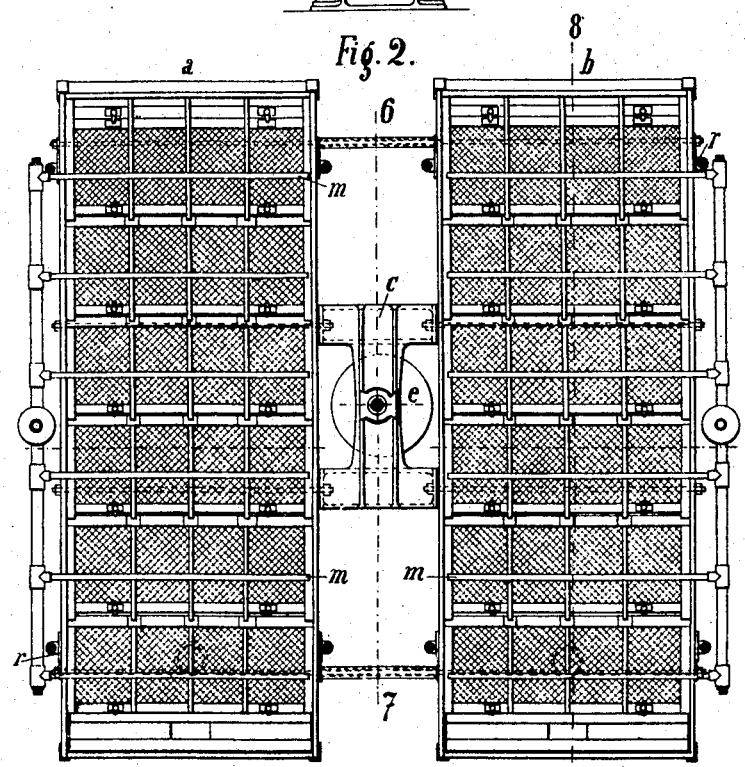

In order to make my invention more clear I refer to the accompanying drawings in which similar letters denote similar parts throughout the several views and in which:

Figure 1 is an end-view of my improved apparatus, Fig. 2 is a plan of the same, Fig. 3 is a section in line 6—7 of Fig. 2, Fig. 4 is a section in line 8—9 of Fig. 2, and Fig. 5 is a representation of a detail which will be duly referred to hereinafter.

My improved apparatus consist of two bodies $a$ and $b$, the construction of which is perfectly equal and which are arranged side by side and rigidly connected with each other by a kind of traverse $c$. The middle portion of this traverse embraces a pivot $d$ located eccentrically in a disk $e$ fixed to a shaft $g$ carrying a pulley $f$, by which the whole apparatus is actuated. The shaft $g$ is held by a bearing body $h$ secured to the bottom by any suitable means. As soon as the parts $f g$ and $e$ rotate, the pivot $d$ moves in a circle and so do all the other parts connected with, and moved by, said pivot.

The disk $e$ contains besides the pivot $d$ a counterpoise $i$, the weight and arrangement of which is such that the one-sided draft or pressure of the pivot $d$ is completely compensated so that the apparatus moves without any push or jerk and, therefore, also only a small expenditure of power is caused.

The materials to be extracted are introduced into the funnel or hopper $k$, the lower orifice of which can be adjusted according to the kind of material to be treated. The particles of the material then pass over the steps $l$ each of which consists of a sieve, and while passing over these steps or sieves, the material is exposed to the action of jets of water coming down from pipes $m$ located above the sieve or sieves. The starch-milk, thus obtained, is caught up by the oblique walls $n$ and leaves the apparatus through the piece of tube $o$ whereas the remainders get off at $p$.

The degree of inclination of the sieve or sieves may be adjusted by screw-threaded spindles $r$ or the like. These spindles pass through nuts attached to the apparatus and the spindles are attached to wire-ropes $q$ suspended from the ceiling of the room containing the apparatus in question.

Having now described the nature of my invention, what I desire to secure by a Patent of the United States is:

In an apparatus for washing out the starch from disintegrated starch-containing materials, the combination of two frames ($a$, $b$) rigidly connected with each other, of sieves (*l*) arranged in steps within said frames, a traverse (*e*) connecting the said frames, a disk (*c*) located below said traverse, a pivot (*d*) situated eccentrically within said disk and connecting the latter with the said traverse, hoppers attached to the said frames, wire-ropes (*q*) suspended from above and adapted to hold the frames in an inclined position, means for changing the degree of inclination so as, thereby, also to change the degree of inclination of the steplike sieves, and means for producing jets of water adapted to act upon the material while passing away over the sieves, substantially and for the purpose as described.

In witness whereof I have hereunto set my hand in presence of two witnesses.

WILHELM HEINRICH UHLAND.

Witnesses:
 MARGARETHE FUNCK,
 RUDOLPH FRICKE.